United States Patent
Meissner (10) Patent No.: US 11,707,117 B2
(45) Date of Patent: Jul. 25, 2023

(54) MAGNETIC APPAREL CINCHING CLIP

(71) Applicant: Tara Meissner, Henderson, NV (US)

(72) Inventor: Tara Meissner, Henderson, NV (US)

(\*) Notice: Subject to any disclaimer, the term of this patent is extended or adjusted under 35 U.S.C. 154(b) by 291 days.

(21) Appl. No.: 16/953,996

(22) Filed: Nov. 20, 2020

(65) Prior Publication Data

US 2021/0068505 A1 Mar. 11, 2021

Related U.S. Application Data

(63) Continuation-in-part of application No. 15/986,682, filed on May 22, 2018, now abandoned.

(60) Provisional application No. 62/509,610, filed on May 22, 2017.

(51) Int. Cl.
| | |
|---|---|
| *A44B 11/06* | (2006.01) |
| *A44C 1/00* | (2006.01) |
| *F16B 2/20* | (2006.01) |

(52) U.S. Cl.
CPC .............. *A44B 11/06* (2013.01); *A44C 1/00* (2013.01); *F16B 2/20* (2013.01); *A44D 2203/00* (2013.01); *A44D 2211/00* (2013.01)

(58) Field of Classification Search
CPC .......... A44B 11/06; A41F 17/02; A41F 1/002; A41D 27/08; A44C 1/00; A44D 2203/00; A44D 2211/00; F16B 2/20
See application file for complete search history.

(56) References Cited

U.S. PATENT DOCUMENTS

| | | | |
|---|---|---|---|
| 2,637,887 A | 5/1953 | Goodman et al. | |
| 5,682,653 A * | 11/1997 | Berglof | G09F 1/10 224/183 |
| 5,806,346 A * | 9/1998 | Schlinger | A44C 5/2071 63/900 |
| 6,606,767 B2 * | 8/2003 | Wong | A41F 1/006 24/303 |
| 6,622,349 B2 * | 9/2003 | Wong | A41F 1/006 24/303 |
| 7,320,156 B1 | 1/2008 | Slayton | |
| 7,793,518 B1 | 9/2010 | Holleman | |
| 8,640,266 B2 * | 2/2014 | Best | A41F 19/00 2/104 |
| D702,936 S | 4/2014 | Burkett | |
| 8,985,408 B2 | 3/2015 | Lloyd et al. | |
| 9,320,450 B2 * | 4/2016 | Badower | A41F 1/002 |
| 9,339,091 B2 * | 5/2016 | Kaupp | A44C 25/007 |
| D792,129 S | 7/2017 | Best | |
| 9,797,420 B2 * | 10/2017 | Vecchione | F16B 1/00 |
| D810,403 S | 2/2018 | Grenville | |
| D831,936 S | 10/2018 | Gladden et al. | |

(Continued)

*Primary Examiner* — Robert Sandy
*Assistant Examiner* — Louis A Mercado
(74) *Attorney, Agent, or Firm* — Nguyen Tarbet LLC (57) ABSTRACT

A magnetic apparel cinch apparatus for securely gathering or taking up slack or adjusting a hem in an article of clothing is provided. A magnetic first member and a magnetic second member coupled via a link strap are featured. A user may gather a portion of the article of clothing and secure said gathering by meeting the first member and the second member such that the portion of the article of clothing gathered by the user is secured in place by the link strap. The magnets in the apparel cinch clip are permanently secured in the first member and the second member to ensure best use, user safety, and to avoid damage to the magnets.

20 Claims, 9 Drawing Sheets

(56) References Cited

U.S. PATENT DOCUMENTS

| | | | |
|---|---|---|---|
| 10,327,490 B2* | 6/2019 | Pevenstein | A44C 5/2076 |
| D868,427 S | 12/2019 | Meissner | |
| 11,445,789 B2* | 9/2022 | Dorsey | A44C 15/005 |
| 2006/0174649 A1* | 8/2006 | Azrielant | A44C 7/00 |
| | | | 63/14.1 |
| 2010/0083699 A1 | 4/2010 | Conigliaro | |
| 2011/0239702 A1 | 10/2011 | Best et al. | |
| 2012/0077416 A1 | 3/2012 | Xu | |
| 2012/0125046 A1* | 5/2012 | Vander Wal | H01F 7/0263 |
| | | | 24/303 |
| 2012/0291233 A1 | 11/2012 | Wilkinson | |
| 2013/0173501 A1 | 7/2013 | Wrubel | |
| 2014/0130312 A1 | 5/2014 | Jamroz | |
| 2014/0223702 A1 | 8/2014 | Stevenson | |
| 2016/0278463 A1 | 9/2016 | Stevenson | |
| 2017/0224066 A1* | 8/2017 | Sozio | A44C 9/00 |
| 2018/0295952 A1 | 10/2018 | Rachel | |
| 2018/0332913 A1 | 11/2018 | Meissner | |

* cited by examiner

MAGNETIC APPAREL CINCHING CLIP

CROSS REFERENCE

This application is a continuation-in-part and claims benefit to U.S. patent application Ser. No. 15/986,682 filed May 22, 2018, which claims benefit to U.S. Provisional Patent Application No. 62/509,610 filed May 22, 2017, the specification(s) of which is/are incorporated herein in their entirety by reference.

FIELD OF THE INVENTION

The present invention relates to a cinch apparatus, more specifically, to an apparel cinch apparatus for securely gathering or taking up slack in an article of clothing, e.g., adjusting the length of a hemline.

BACKGROUND OF THE INVENTION

Current designs of apparel clips do not have a free flowing link strap. As such, these designs are ineffective for shortening the hem line on an array of garments such as pants, dresses, skirts, blouses, shirt sleeves, suit jackets sleeves, etc. These apparel clips, also referred to as T-shirt clips, are typically composed of hard plastic, which is not maneuverable and does not allow for adjustments of long hems on portions of garments (e.g. pant legs and sleeve lengths). They are also not fabric friendly and, after use, the garment often exhibits signs of wear at the attachment location leaving the clothing material stretched out, severely wrinkled, and quite often permanently damaged.

The present invention features an apparel cinch clip that is non-damaging, practical, and designed to provide any desired hem length for a variety of garments, thus giving garments an unseen versatility. The present apparel cinch clip does not affect the integrity of the garment's fabric as a result of the gentle force provided by the magnets in the dip, which keeps both the exterior and the interior gatherings of clothing in place. Further, a link strap is able to absorb the slack (e.g. the excess fabric that one wishes to hold up) of the hemline and the weight of the slack, thus providing ease of movement all day long. The apparel cinch clip of the present invention is the no damage, no fuss, no slide (or gravity pull) clip desired by every fashionista.

SUMMARY OF THE INVENTION

An apparel cinch clip for securely gathering or taking up slack, such as adjusting a hem, a hemline adjuster or an adjuster of hemline, in an article of clothing is presently disclosed. In some embodiments the apparel cinch clip comprises a first member and a second member joined by a link strap. The magnets in the apparel cinch clip are permanently secured in the first member and the second member to ensure best use, user safety, and to avoid damage to the magnets.

In further embodiments, the first member comprises a magnet housing having a front surface, a top end and a bottom end. A first magnet is disposed within the magnet housing, and a first groove is disposed along a boundary of the magnet housing. A second groove is disposed on the inside of the magnet housing, and a first hole is disposed at a top end of the second groove and the top end of the second groove aligns with the top end of the magnet housing. In some embodiments, the first member may further comprise a closing component having top end, a bottom end, and a first ridge complementary to the first groove disposed along a boundary of the closing component. The first groove and the first ridge snap into place and securely hold the first magnet inside the first member. The closing component further comprises a second hole disposed at the top end of the closing component, and a third groove is disposed on the inside of the closing component.

In other embodiments, the second member comprises a decorative component and a decorative component closing cap. The decorative component comprises a decorative component front surface having a decorative component top end, a decorative component bottom end, and a decorative component back surface, and a cavity is disposed within the decorative component back surface. A second magnet is disposed in the cavity, the cavity is the same shape as a decorative component closing cap, and a fourth groove is disposed along a boundary of the cavity. The decorative component closing cap comprises a tab with a third hole disposed through the tab. The tab is aligned with the decorative component top end. A second ridge complementary to the fourth groove is disposed along a boundary of the decorative component closing cap such that the fourth groove and the second ridge snap into place and hold the second magnet inside the second member.

The connector piece comprises a first end and a second end, and a first hole is disposed at the first end of the connector piece and a second hole is disposed at the second end of the connector piece, and the connector piece is u-shaped from the first end to the second end. The first segment comprises a first strap end and a second strap end. The first strap end of the first segment is coupled to the third hole of the decorative component closing cap, and the second strap end of the first segment is coupled to the first hole of the connector piece. The second segment comprises a first strap end and a second strap end. The second segment is threaded through the second hole of the connector piece, and the first strap end of the second segment is threaded through the first hole of the magnet housing, and is fixedly disposed in the second groove of the magnet housing. The second strap end of the second segment is threaded through the second hole of the closing component and is fixedly disposed in the third groove of the closing component. The first strap end and the second strap end of the second segment are secured in place with an adhesive.

In preferred embodiments, to use the apparel cinch clip, a user loops the link strap around the clothing such that the clothing is disposed between the first magnet and the second magnet, and the first magnet is magnetically connected to the second magnet thereby securing in place the gathering or slack in the article of clothing. In some embodiments, the decorative component front surface and the front surface of the magnet housing meet such that the first and second magnets contact to lock the first member to the second member.

BRIEF DESCRIPTION OF THE DRAWINGS

The features and advantages of the present invention will become apparent from a consideration of the following detailed description presented in connection with the accompanying drawings in which.

Figure 1:
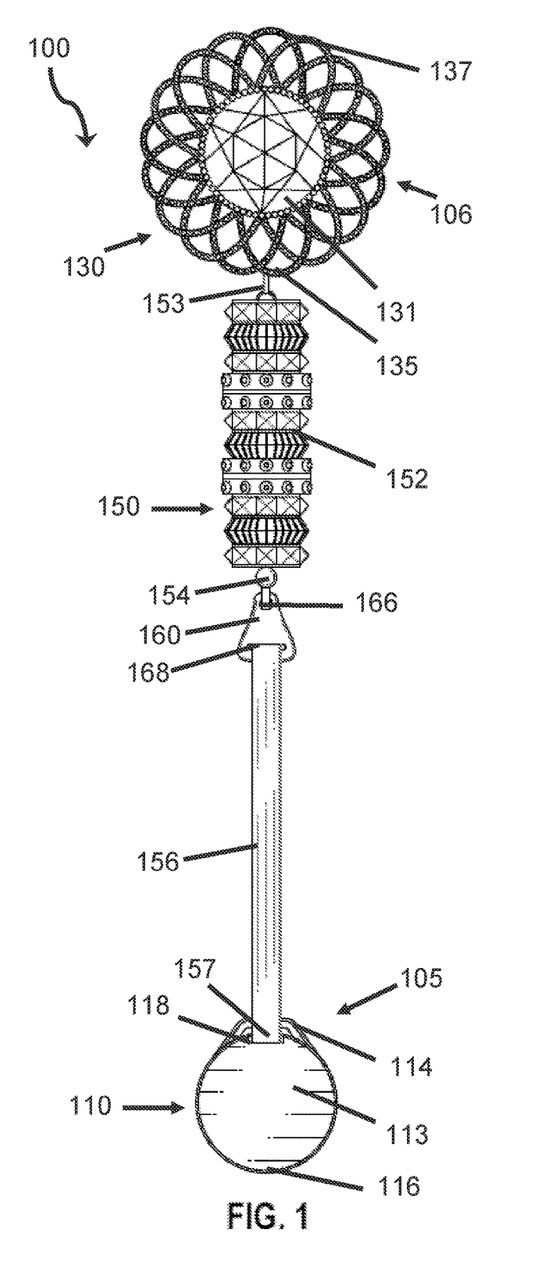
FIG. 1 shows a front view of an apparel cinch clip of the present invention.
Figure 2:
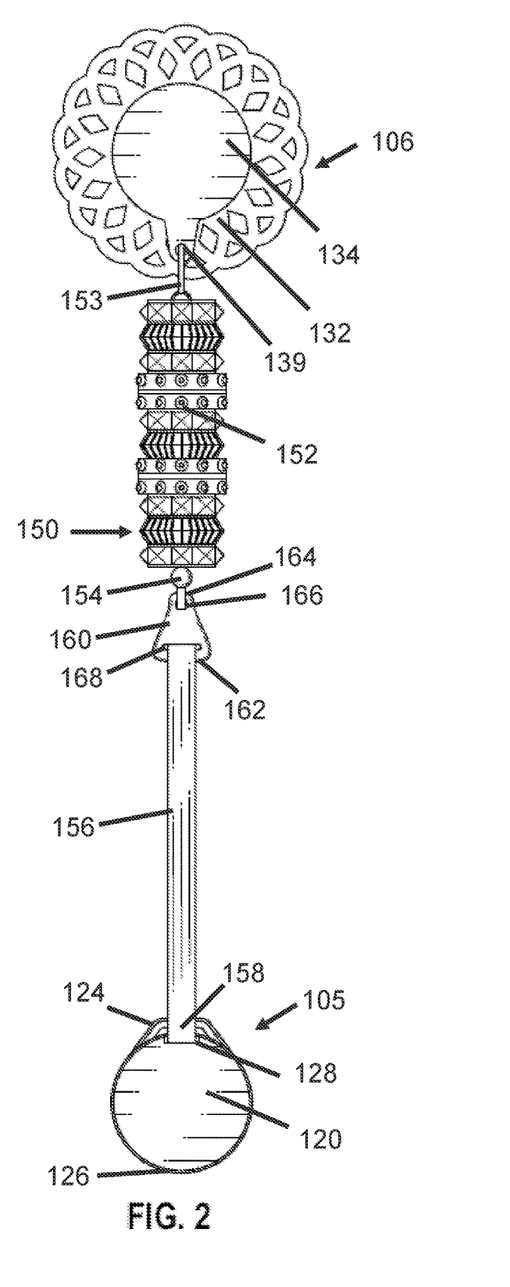
FIG. 2 shows a back view of the apparel cinch clip.

DETAILED DESCRIPTION OF THE INVENTION 100 cinch clip
105 first member
106 second member
110 magnet housing
112 cut out
113 first member front surface
114 first member top end
115 first magnet
116 first member bottom end
117 first groove
118 first hole
119 second groove
120 closing cap
121 closing cap cut out
124 closing cap top end
126 closing cap bottom end
127 first ridge
128 second hole
129 third groove
130 decorative component
131 decorative component front surface
132 decorative component back surface
133 second magnet
134 decorative component closing cap
135 decorative component top end
136 cavity
137 decorative component bottom end
138 decorative component closing cap tab
139 third hole
141 fourth groove
142 decorative component closing cap cut out
143 second ridge
144 decorative component closing cap tongue
145 decorative component closing cap pole
146 decorative component hole
147 decorative component closing cap inner groove
150 link strap
152 link strap first segment
153 first segment first strap end
154 first segment second strap end
156 link strap second segment
157 second segment first strap end
158 second segment second strap end
160 connector piece
162 connector piece first end
164 connector piece second end
166 connector piece first hole
168 connector piece second hole
172 first protrusion
174 second protrusion
176 first indent
178 second indent
182 closing component downward cut
184 magnet housing downward cut Referring now to FIGS. 1-2, the present invention features an apparel cinch clip (100) for securely gathering or taking up slack in an article of clothing. In some embodiments, the cinch clip (100) may comprise a first member (105) and a second member (106) joined by a link strap (150).

In preferred embodiments, the first member (105) comprises a magnet housing (110) having a front surface (113), a top end (114) and a bottom end (116). A first magnet (115) is disposed within the magnet housing (110), and a first groove (117) is disposed along a boundary of the magnet housing (110). A second groove (119) is disposed on the inside of the magnet housing (110), and a first hole (118) is disposed at a top end of the second groove (119) and the top end of the first groove aligns with the top end (114) of the magnet housing (110).

In some embodiments, the first member (105) further comprises a closing component (120) having top end (124), a bottom end (126), and a first ridge (127) complementary to the first groove (117) disposed along a boundary of the closing component. The first groove (117) and the first ridge (127) snap into place and hold the first magnet (115) inside the first member (105). The closing component further comprises a second hole (128) disposed at the top end (124) of the closing component, and a third groove (129) is disposed on the inside of the closing component.

In other embodiments, the second member (106) comprises a decorative component (130) and a decorative component closing cap (134). The decorative component comprises a decorative component front surface (131) having a decorative component top end (135), a decorative component bottom end (137), and a decorative component back surface (132), and a cavity (136) is disposed within the decorative component back surface (132). A second magnet (133) is disposed in the cavity (136), the cavity (136) is the same shape as a decorative component closing cap (134), and a fourth groove (141) is disposed along a boundary of the cavity (136). The decorative component closing cap comprises a tab (138) with a third hole (139) disposed through the tab (138). The second magnet (133) is disposed in the cavity, and the tab (138) is aligned with the decorative component top end (135). A second ridge (143) complementary to the fourth groove (141) is disposed along a boundary of the decorative component closing cap such that the fourth groove (141) and the second ridge (143) snap into place and hold the second magnet (133) inside the second member (106).

In further embodiments, the link strap (150) comprises a first segment (152), a second segment (156), and a connector piece (160). The connector piece comprises a first end (162) and a second end (164), and a first hole (166) is disposed at the first end of the connector piece and a second hole (168) is disposed at the second end of the connector piece, and the connector piece is u-shaped from the first end (162) to the second end (164). The first segment comprises a first strap end (153) and a second strap end (154). The first strap end (153) of the first segment is coupled to the third hole (139) of the decorative component closing cap, and the second strap end (154) of the first segment (152) is coupled to the first hole (166) of the connector piece (160). The second segment (156) comprises a first strap end (157) and a second strap end (158). The second segment (156) is threaded through the second hole (168) of the connector piece (160), and the first strap end (157) of the second segment is threaded through the first hole (118) of the magnet housing (110), and is fixedly disposed in the second groove (119) of the magnet housing (110). The second strap end (158) of the second segment (156) is threaded through the second hole (128) of the closing component and is fixedly disposed in the third groove (129) of the closing component (120). The first strap end (157) and the second strap end (158) of the second segment are secured in place with an adhesive.

In preferred embodiments, to use the apparel cinch clip (100), a user loops the link strap (150) around the clothing such that the clothing is disposed between the first magnet and the second magnet, and the first magnet (115) is magnetically connected to the second magnet (133) thereby securing in place the gathering or slack in the article of clothing. In other embodiments, the first member (105) is made of magnetic metal material and there is no magnet disposed within the first member (105) such that the first member magnetically connects to the second member (106) via the second magnet (133). In one embodiment, the second member (106) is made of magnetic metal material and there is no magnet disposed within the second member (106) such that the first member connects to the second member via the first magnet (115).

In some embodiments, the decorative component front surface (131) and the front surface (113) of the magnet housing (110) meet such that the first (115) and second (133) magnets contact to lock the first member (105) to the second member (106).

In other embodiments, the first segment (152) of the link strap (150) is decorative. The first segment (152) of the link strap (150) may comprise, but is not limited to, beads, chains, a strap of leather, fabric, wire or string. In some embodiments, the second segment (156) of the link strap (150) is plain. The second segment (156) of the link strap (150) may comprise, but is not limited to, a ribbon, a string, fabric, or a strap of leather. Referring now to FIGS. 1, 2, 3A-3C, 5A-5C, and 6, in one embodiment, the decorative component is shaped like a flower. Other embodiments of the shape of the decorative component include, but are not limited to, a circle, a bow, a heart, a rectangle, a triangle, etc.

In preferred embodiments, the first hole (166) of the connecting piece is a pinhole, and the second hole (168) of the connecting piece is elongated.

In other embodiments, the present invention features an apparel cinch clip (100) for securely gathering or taking up slack in an article of clothing. In some embodiments, the cinch clip (100) comprises a first member (105) and a second member (106) joined by a link strap (150).

Referring now to FIGS. 4A-4I, the first member (105) comprises a magnet housing (110) having a front surface (113), a top end (114) and a bottom end (116). A first magnet (115) is disposed within the magnet housing (110), and a first groove (117) is disposed along a boundary of the magnet housing (110). A second groove (119) is disposed on the inside of the magnet housing (110), and a first hole (118) is disposed at a top end of the second groove (119) and the top end of the first groove aligns with the top end (114) of the magnet housing (110). In further embodiments, a faux handle is disposed at the top end (114) of the magnet housing (110) to give the appearance that the link strap is threaded through the handle. In other embodiments, the magnet housing (110) comprises a first indent (176) and a second indent (178) at the top end (114) of the magnet housing (110). In other embodiments, the magnet housing (110) further comprises a downward cut (184) at a top end (114) and an edge of the magnet housing (110) such that a ribbon can fit into the downward cut (184) and can be threaded through the first hole (118).

In some embodiments, the first member (105) further comprises a closing component (120) having top end (124), a bottom end (126), and a first ridge (127) complementary to the first groove (117) disposed along a boundary of the closing component. The first groove (117) and the first ridge (127) snap into place and hold the first magnet (115) inside the first member (105). In some embodiments, at least one cutout (121) is disposed on the boundary of the closing component (120). The at least one cutout (121) allows the boundary to flex when the magnet housing (110) and the closing component (120) are snapped together. The closing component further comprises a second hole (128) disposed at the top end (124) of the closing component, and a third groove (129) is disposed on the inside of the closing component. In some embodiments, the closing component (120) comprises a first protrusion (172) and a second protrusion (174) at the top end (124) of the closing component (120). When the magnet housing (110) and the closing component (120) are snapped together, the first protrusion (172) fits snugly against the first indent (176) and the second protrusion (174) fits snugly against the second indent (178). In other embodiments, the closing component (120) further comprises a downward cut at a top end (124) and an edge of the closing component (120) such that a ribbon can fit into the downward cut (182) and can be threaded through the second hole (128).

Figure 5A:
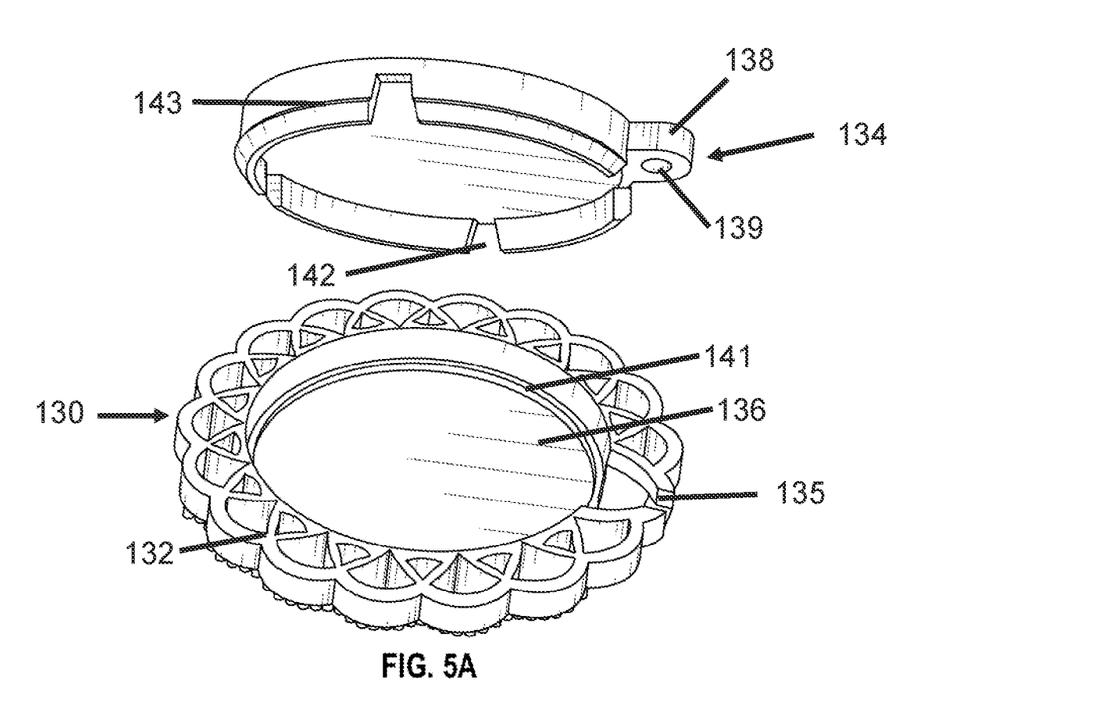
FIGS. 5A-5C show another embodiment of the second member that shows at least one cut out disposed on the boundary of the decorative component closing cap.
Figure 5B:
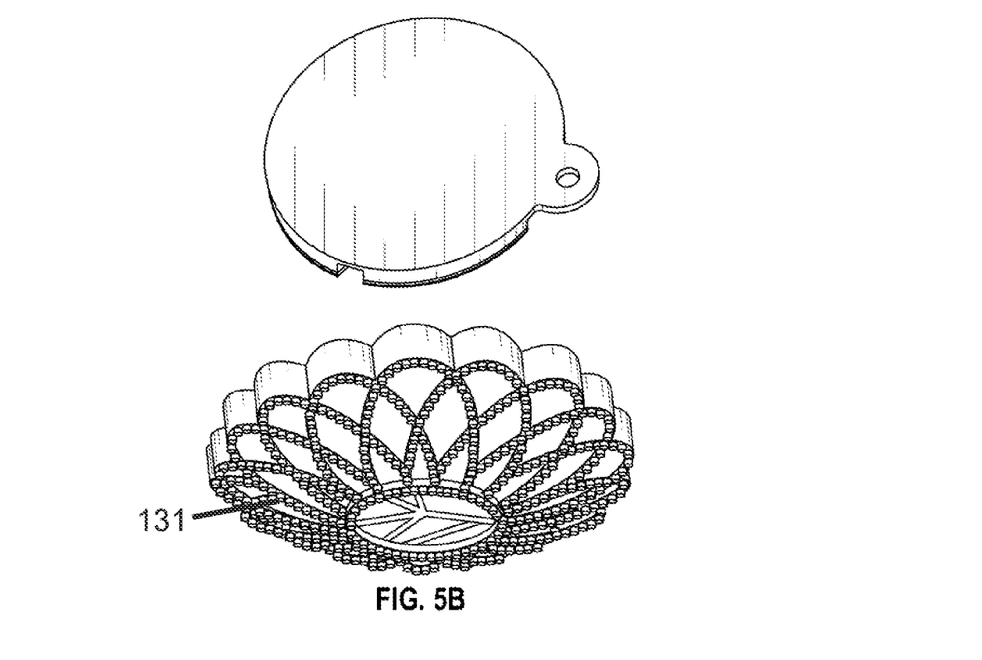
Figure 5C:
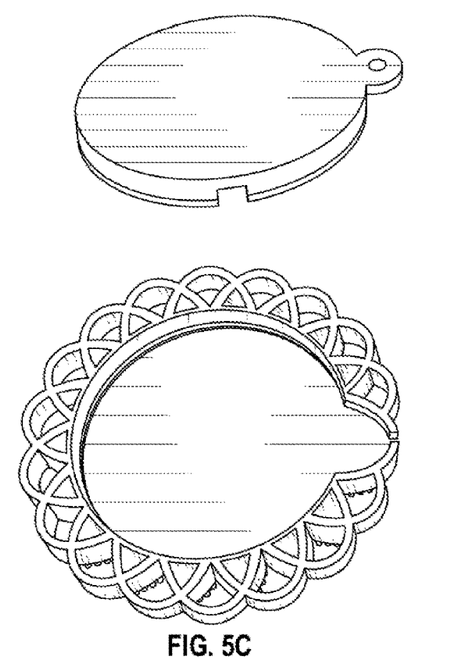
Figure 6:
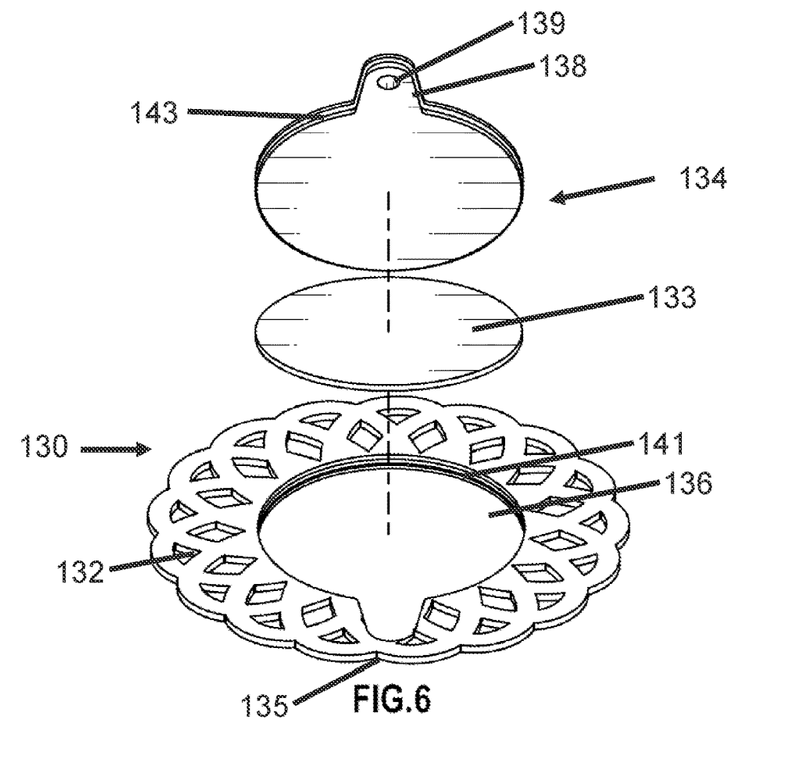
FIG. 6 shows a diagrammatic representation of the second member of the apparel cinch clip.
Figure 7:
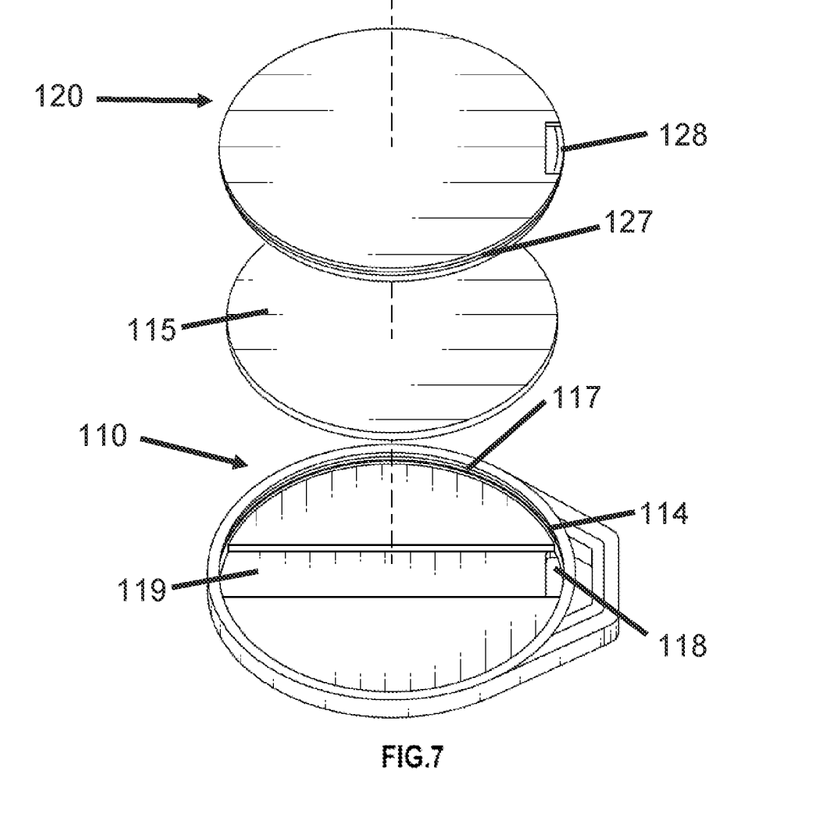
FIG. 7 shows a diagrammatic representation of the first member of the apparel cinch clip.

Referring now to FIGS. 5A-5C, the second member (106) comprises a decorative component (130) and a decorative component closing cap (134). The decorative component comprises a decorative component front surface (131) having a decorative component top end (135), a decorative component bottom end (137), and a decorative component back surface (132), and a cavity (136) is disposed within the decorative component back surface (132). A second magnet (133) is disposed in the cavity (136), the cavity (136) is the same shape as a decorative component closing cap (134), and a fourth groove (141) is disposed along a boundary of the cavity (136). The decorative component closing cap comprises a tab (138) with a third hole (139) disposed through the tab (138). The second magnet (133) is disposed in the cavity, and the tab (138) is aligned with the decorative component top end (135). A second ridge (143) complementary to the fourth groove (141) is disposed along a boundary of the decorative component closing cap such that the fourth groove (141) and the second ridge (143) snap into place and hold the second magnet (133) inside the second member (106). In further embodiments, at least one cut out (142) is disposed on the boundary of the decorative component closing cap (134). The cut out allows the boundary to flex when the decorative closing cap (134) is snapped into the decorative component (130).

In further embodiments, the link strap (150) comprises a first segment (152), a second segment (156), and a connector piece (160). The connector piece comprises a first end (162) and a second end (164), and a first hole (166) is disposed at the first end of the connector piece and a second hole (168) is disposed at the second end of the connector piece, and the connector piece is u-shaped from the first end (162) to the second end (164). The first segment comprises a first strap end (153) and a second strap end (154). The first strap end (153) of the first segment is coupled to the third hole (139) of the decorative component closing cap, and the second strap end (154) of the first segment (152) is coupled to the first hole (166) of the connector piece (160). The second segment (156) comprises a first strap end (157) and a second strap end (158). The second segment (156) is threaded through the second hole (168) of the connector piece (160), and the first strap end (157) of the second segment is threaded through the first hole (118) of the magnet housing (110), and is fixedly disposed in the second groove (119) of the magnet housing (110). The second strap end (158) of the second segment (156) is threaded through the second hole (128) of the closing component and is fixedly disposed in the third groove (129) of the closing component (120). The first strap end (157) and the second strap end (158) of the second segment are secured in place with an adhesive.

In preferred embodiments, to use the apparel cinch clip (100), a user loops the link strap (150) around the clothing such that the clothing is disposed between the first magnet and the second magnet, and the first magnet (115) is magnetically connected to the second magnet (133) thereby securing in place the gathering or slack in the article of clothing.

In other embodiments, the first segment (152) of the link strap (150) is decorative. The first segment (152) of the link strap (150) may comprise, but is not limited to, beads, chains, a strap of leather, fabric, wire or string. In some embodiments, the second segment (156) of the link strap (150) is plain. The second segment (156) of the link strap (150) may comprise, but is not limited to, a ribbon, a string, fabric, or a strap of leather.

In preferred embodiments, the first hole (166) of the connecting piece is a pinhole, and the second hole (168) of the connecting piece is elongated.

In other embodiments, the present invention features an apparel cinch clip (100) for securely gathering or taking up slack in an article of clothing. In some embodiments, the cinch clip (100) comprises a first member (105) and a second member (106) joined by a link strap (150).

In preferred embodiments, the first member (105) comprises a magnet housing (110) having a front surface (113), a top end (114) and a bottom end (116). A first magnet (115) is disposed within the magnet housing (110), and a first groove (117) is disposed along a boundary of the magnet housing (110). A second groove (119) is disposed on the inside of the magnet housing (110), and a first hole (118) is disposed at a top end of the second groove (119) and the top end of the first groove aligns with the top end (114) of the magnet housing (110). In further embodiments, a faux handle is disposed at the top end (114) of the magnet housing (110) to give the appearance that the link strap is threaded through the handle.

In some embodiments, the first member (105) further comprises a closing component (120) having top end (124), a bottom end (126), and a first ridge (127) complementary to the first groove (117) disposed along a boundary of the closing component. The first groove (117) and the first ridge (127) snap into place and hold the first magnet (115) inside the first member (105). In some embodiments, at least one cutout (121) is disposed on the boundary of the closing component (120). The at least one cutout (121) allows the boundary to flex when the magnet housing (110) and the closing component (120) are snapped together. The closing component further comprises a second hole (128) disposed at the top end (124) of the closing component, and a third groove (129) is disposed on the inside of the closing component.

Figure 3A:
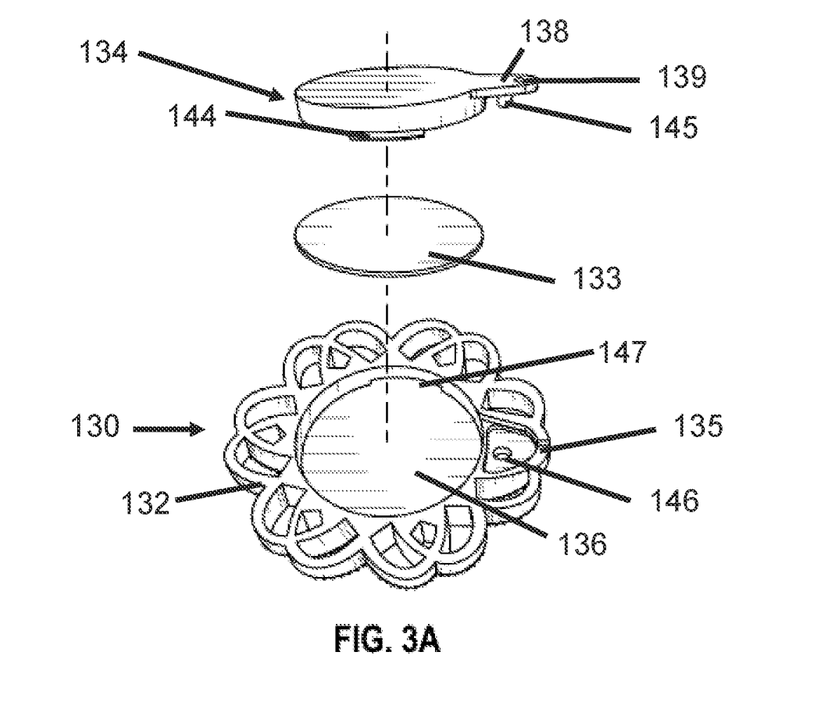
FIGS. 3A-3C show one embodiment of the second member that shows a pole disposed on the tab of the decorative component closing cap. In this embodiment, the decorative component closing cap comprises two tongues on opposing sides of the closing cap that slide into two grooves on opposing sides of the inner edge of the decorative component.
Figure 3B:
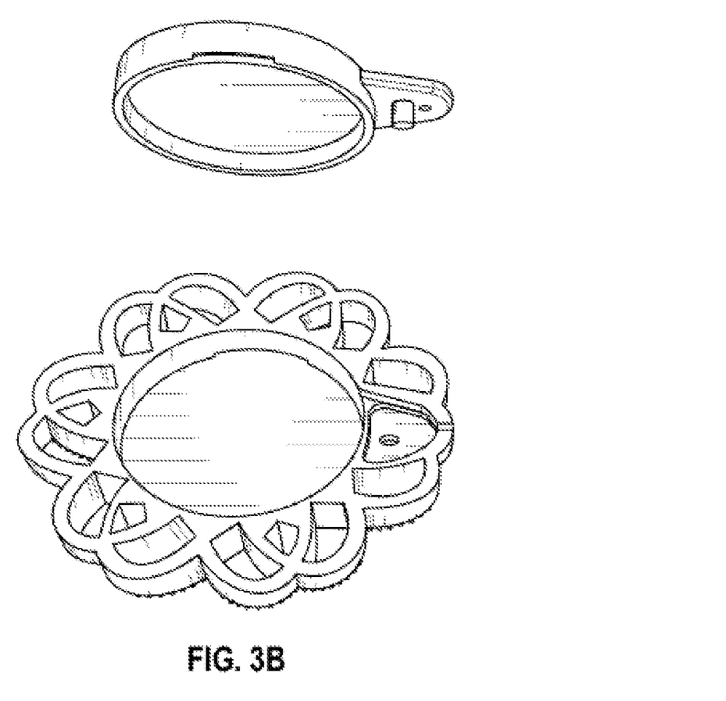
Figure 3C:
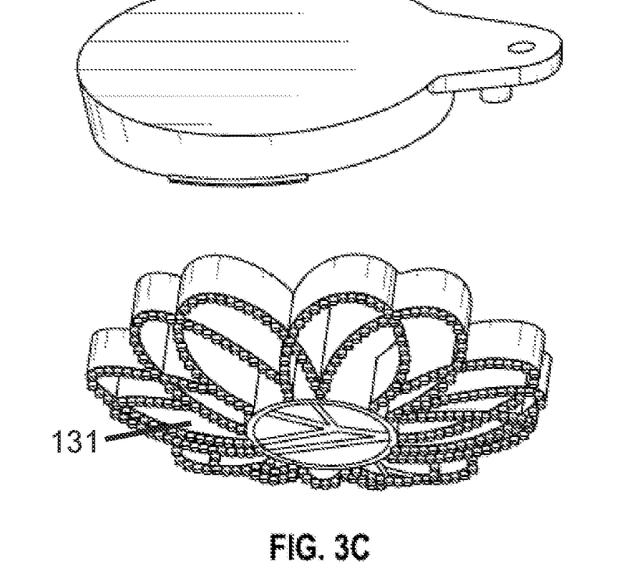
Figure 4A:
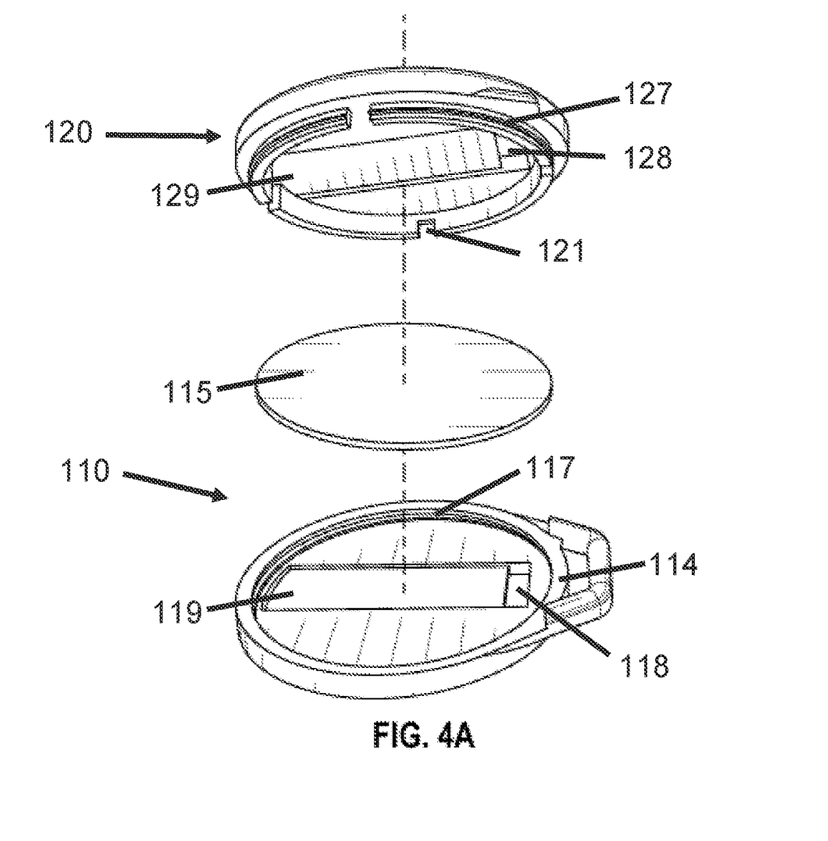
FIGS. 4A-4I show one embodiment of the first member that shows at least one cut out disposed on the boundary of the magnet housing. This embodiment further comprises a faux handle disposed at the top end of the first member.
Figure 4B:
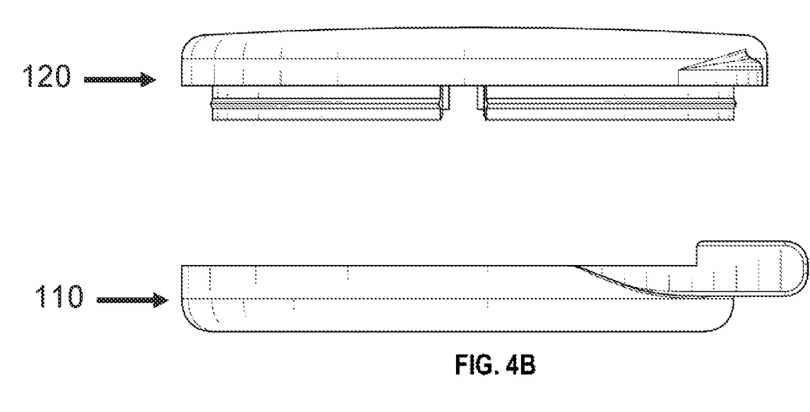
Figure 4C:
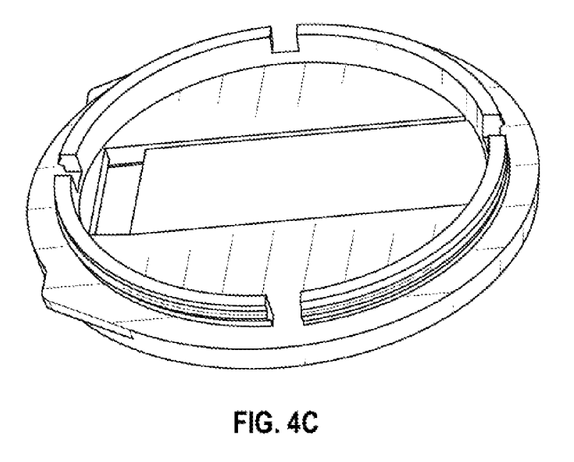
Figure 4D:
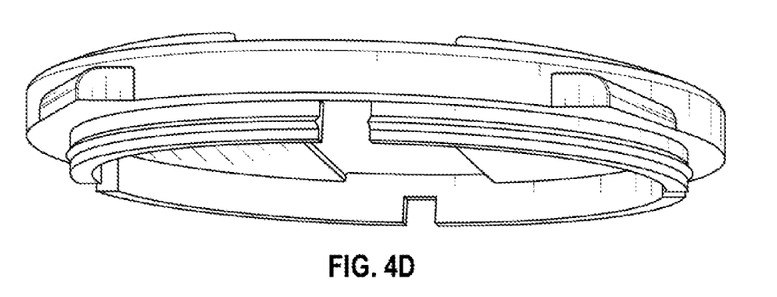
Figure 4E:
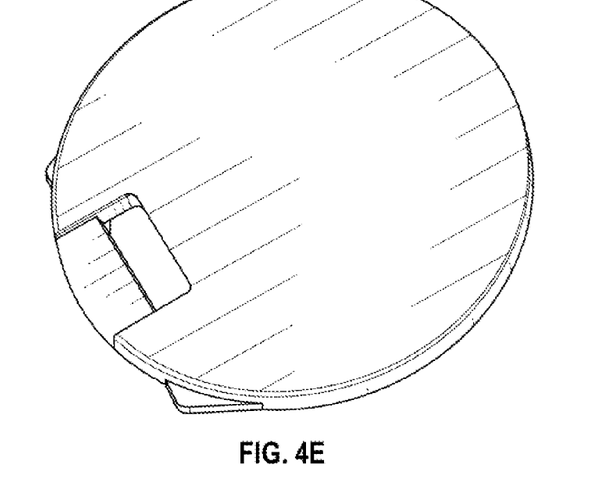
Figure 4F:
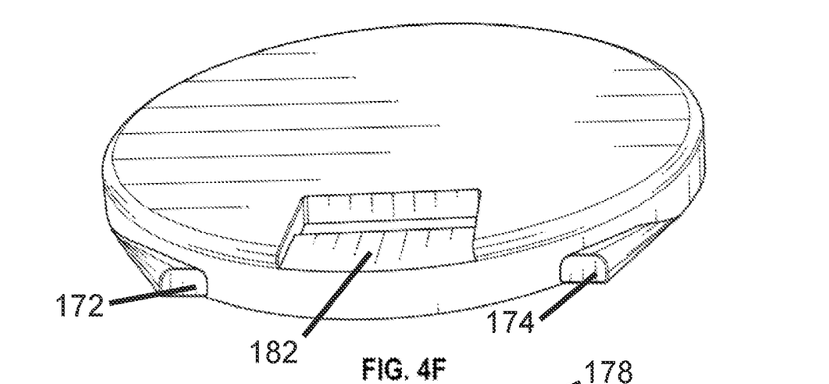
Figure 4G:
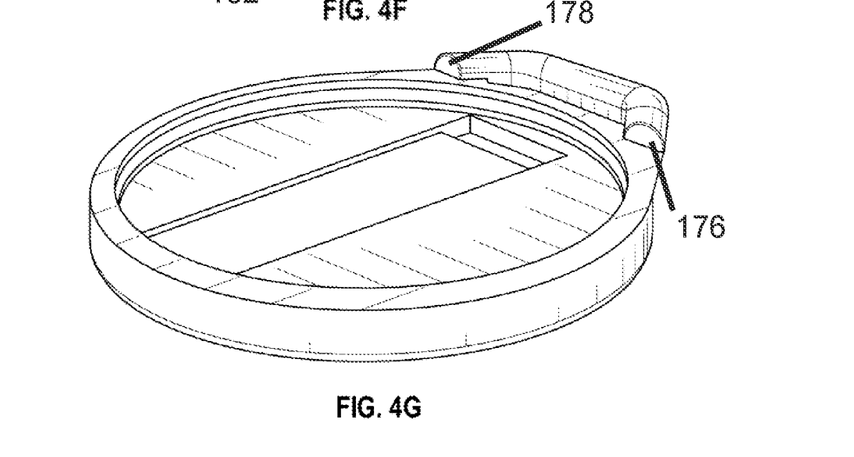
Figure 4H:
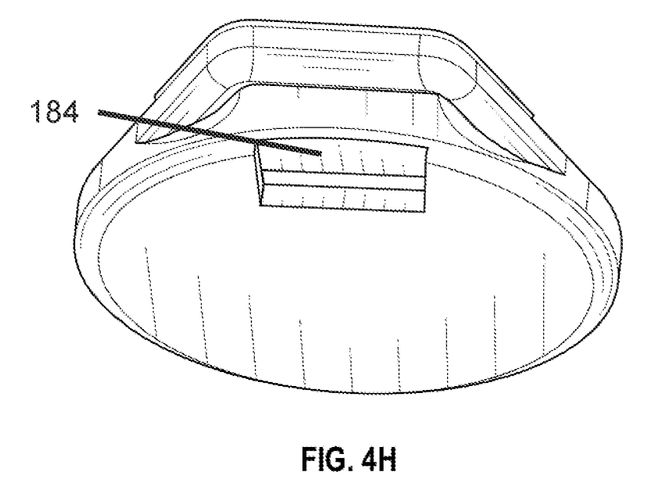
Figure 4I:
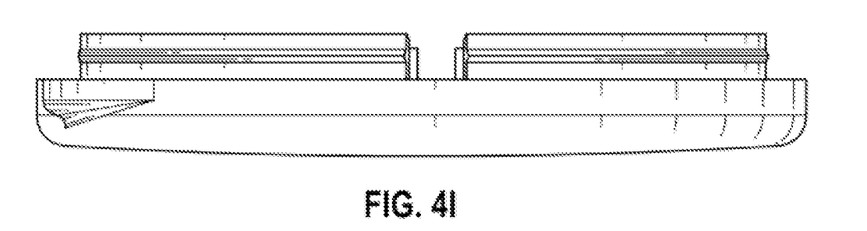

Referring now to FIGS. 3A-3C, in some embodiments, the second member (106) comprises a decorative component (130) and a decorative component closing cap (134). The decorative component comprises a decorative component front surface (131) having a decorative component top end (135), a decorative component bottom end (137), and a decorative component back surface (132), and a cavity (136) is disposed within the decorative component back surface (132). A second magnet (133) is disposed in the cavity (136), the cavity (136) is the same shape as a decorative component closing cap (134), and at least one groove (147) is disposed at a bottom of a side of the cavity (136). In further embodiments, a hole (146) is disposed inside and at the top end (135) of the decorative component (130).

In some embodiments, the decorative component closing cap comprises a tab (138) with a third hole (139) disposed through the tab (138) and a pole (145) disposed on the tab under the third hole (139). The pole (145) fits into the hole (146) of the decorative component (130). In further embodiments, at least one tongue (144) is disposed on the boundary of the decorative component closing cap (134) such that the at least one tongue (144) fits into the at least one groove (147) to snap into place and hole the second magnet (133) in the second member (106). The second magnet (133) is disposed in the cavity, and the tab (138) is aligned with the decorative component top end (135).

In further embodiments, the link strap (150) comprises a first segment (152), a second segment (156), and a connector piece (160). The connector piece comprises a first end (162) and a second end (164), and a first hole (166) is disposed at the first end of the connector piece and a second hole (168) is disposed at the second end of the connector piece, and the connector piece is u-shaped from the first end (162) to the second end (164). The first segment comprises a first strap end (153) and a second strap end (154).

The first strap end (153) of the first segment is threaded through the third hole (139) of the decorative component closing cap and wrapped around the pole (145) to secure the first segment in the decorative component, and the second strap end (154) of the first segment (152) is coupled to the first hole (166) of the connector piece (160). The second segment (156) comprises a first strap end (157) and a second strap end (158). The second segment (156) is threaded through the second hole (168) of the connector piece (160), and the first strap end (157) of the second segment is threaded through the first hole (118) of the magnet housing (110), and is fixedly disposed in the second groove (119) of the magnet housing (110). The second strap end (158) of the second segment (156) is threaded through the second hole (128) of the closing component and is fixedly disposed in the third groove (129) of the closing component (120). The first strap end (157) and the second strap end (158) of the second segment are secured in place with an adhesive.

In preferred embodiments, to use the apparel cinch clip (100), a user loops the link strap (150) around the clothing such that the clothing is disposed between the first magnet and the second magnet, and the first magnet (115) is magnetically connected to the second magnet (133) thereby securing in place the gathering or slack in the article of clothing.

In other embodiments, the first segment (152) of the link strap (150) is decorative. The first segment (152) of the link strap (150) may comprise, but is not limited to, beads, chains, a strap of leather, fabric, wire or string. In some embodiments, the second segment (156) of the link strap (150) is plain. The second segment (156) of the link strap (150) may comprise, but is not limited to, a ribbon, a string, fabric, or a strap of leather.

In preferred embodiments, the first hole (166) of the connecting piece is a pinhole, and the second hole (168) of the connecting piece is elongated.

As used herein, the term "about" refers to plus or minus 10% of the referenced number. As used herein, "or" is intended to be inclusive (i.e., "A or B" means "A, B, or both," unless otherwise indicated (e.g., by stating "either A or B.")

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only; and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An apparel cinch clip (100) for securely gathering; or taking up slack in an article of clothing, the cinch clip (100) comprising:
   a. a first member (105) comprising:
      i. a magnet housing (110) having a front surface (113), a top end (114) and a bottom end (116), wherein a first magnet (115) is disposed within the magnet housing (110), wherein a first groove (117) is disposed along a boundary of the magnet housing (110), and wherein a second groove (119) is disposed inside of the magnet housing (110), wherein a first hole (118) is disposed at a top end of the second groove (119), wherein the top end of the second groove is aligned with the top end (114) of the magnet housing (110); and
      ii. a closing component (120) having top end (124), a bottom end (126), a first ridge (127) complementary to the first groove (117) disposed along a boundary of the closing component such that the first groove (117) and the first ridge (127) snap into place and hold the first magnet inside the first member (105), wherein a second hole (128) is disposed at the top end (124) of the closing component, and wherein a third groove (129) is disposed inside of the closing component;
   b. a second member (106) comprising:
      i. a decorative component (130), wherein the decorative component comprises a decorative component front surface (131)) having a decorative component top end (135) and a decorative component bottom end (137) and a decorative component back surface (132), wherein a cavity (136) is disposed within the decorative component back surface (132), wherein a second magnet (133) is disposed in the cavity (136), wherein the cavity (136) is the same shape as a decorative component closing cap (134), wherein a fourth groove (141) is disposed along a boundary of the cavity (136); and
      ii. the decorative component closing cap (134), wherein the decorative component closing cap (134) comprises a tab (138) wherein a third hole (139) is disposed through the tab (138), wherein a second ridge (143) complementary to the fourth groove (141) is disposed along a boundary of the decorative component closing cap such that the fourth groove (141) and the second ridge (143) snap into place and hold the second magnet (133) inside the second member (106), wherein the tab (138) is aligned with the decorative component top end (135); and
   c. a link strap (150) comprising:
      i. a connector piece (160) comprising a first end (162) and a second end (164), wherein a first hole (166) is disposed at the first end of the connector piece, and a second hole (168) is disposed at the second end of the connector piece, wherein the connector piece is u-shaped from the first end (162) to the second end (164);
      ii. a first segment (152) comprising a first strap end (153) and a second strap end (154), wherein the first strap end (153) of the first segment is coupled to the third hole (139) of the decorative component closing cap, wherein the second strap end (154) of the first segment (152) is coupled to the first hole (166) of the connector piece (160); and
      iii. a second segment (156) comprising a first strap end (157) and a second strap end (158), wherein the second segment (156) is threaded through the second hole (168) of the connector piece (160), wherein the first strap end (157) of the second segment is threaded through the first hole (118) of the magnet housing (110) and is fixedly disposed in the second groove (119) of the magnet housing (110), wherein the second strap end (158) of the second segment (156) is threaded through the second hole (128) of the closing component and is fixedly disposed in the third groove (129) of the closing component (120), wherein the first strap end (157) and the second strap end (158) are secured in place with an adhesive; and
   wherein to use the apparel cinch clip (100), a user loops the link strap (150) around the clothing such that the clothing is disposed between the magnets and the first (115) magnet is magnetically connected to the second (133) magnet, thereby securing in place the gathering or the taking up slack in the article of clothing.

2. The apparel cinch clip (100) of claim 1, wherein the first segment (152) of the link strap (150) is decorative.

3. The apparel cinch clip (100) of claim 2, wherein the first segment (152) of the link strap (150) comprises beads, chains, a strap of leather, fabric, wire, or string.

4. The apparel cinch clip (100) of claim 1, wherein the second segment (156) of the link strap (150) is plain.

5. The apparel cinch clip (100) of claim 4, wherein the second segment (156) of the link strap (150) is a ribbon, a string, fabric, or a strap of leather.

6. The apparel cinch clip (100) of claim 1, wherein the first hole (166) of the connecting piece is a pinhole, and the second hole (168) of the connecting piece is elongated.

7. An apparel cinch clip (100) for securely gathering or taking up slack in an article of clothing, the cinch clip (100) comprising:
   a. a first member (105) comprising:
      i. a magnet housing (110) having a front surface (113), a top end (114) and a bottom end (116), wherein a first magnet (115) is disposed within the magnet housing (110), wherein a first groove (117) is disposed along a boundary of the magnet housing (110), and wherein a second groove (119) is disposed inside of the magnet housing (110), wherein a first hole (118) is disposed at a top end of the second groove (119), wherein the top end of the second groove is aligned with the top end (114) of the magnet housing (110); and
      ii. a closing component (120) having a top end (124), a bottom end (126), a first ridge (127) complementary to the first groove (117) disposed along a boundary of the closing component such that the first groove (117) and the first ridge (127) snap into place and hold the first magnet inside the first member (105), wherein at least one cut out (121) is disposed on the boundary of the closing component (120), wherein a second hole (128) is disposed at the top end (124) of the closing component, and wherein a third groove (129) is disposed inside of the closing component;
   b. a second member (106) comprising:
      i. a decorative component (130), wherein the decorative component comprises a decorative component front surface (131) having a decorative component top end (135) and a decorative component bottom end (137) and a decorative component back surface (132), wherein a cavity (136) is disposed within the decorative component back surface (132), wherein a second magnet (133) is disposed in the cavity (136), wherein the cavity (136) is the same shape as a decorative component closing cap (134), wherein a fourth groove (141) is disposed along a boundary of the cavity (136); and
      ii. the decorative component closing cap (134), wherein the decorative component closing cap (134) comprises a tab (138) wherein a third hole (139) is disposed through the tab (138), wherein a second ridge (143) complementary to the fourth groove (141) is disposed along a boundary of the decorative component closing cap such that the fourth groove (141) and the second ridge (143) snap into place and hold the second magnet (133) inside the second member (106), wherein at least one cut out (142) is disposed on the boundary of the decorative component closing cap, wherein the tab (138) is aligned with the decorative component top end (135); and
   c. a link strap (150) comprising:
      i. a connector piece (160) comprising a first end (162) and a second end (164), wherein a first hole (166) is disposed at the first end of the connector piece, and a second hole (168) is disposed at the second end of the connector piece, wherein the connector piece is u-shaped from the first end (162) to the second end (164);
      ii. a first segment (152) comprising a first strap end (153) and a second strap end (154), wherein the first strap end (153) of the first segment is coupled to the third hole (139) of the decorative component closing cap, wherein the second strap end (154) of the first segment (152) is coupled to the the first hole (166) of the connector piece (160); and
      iii. a second segment (156) comprising a first strap end (157) and a second strap end (158), wherein the second segment (156) is threaded through the second hole (168) of the connector piece (160), wherein the first strap end (157) of the second segment is threaded through the first hole (118) of the magnet housing (110) and is fixedly disposed in the second groove (119) of the magnet housing (110), wherein the second strap end (158) of the second segment (156) is threaded through the second hole (128) of the closing component and is fixedly disposed in the third groove (129) of the closing component (120), wherein the first strap end (157) and the second strap end (158) are secured in place with an adhesive; and
wherein to use the apparel cinch clip (100), a user loops the link strap (150) around the clothing such that the clothing is disposed between the magnets and the first (115) magnet is magnetically connected to the second (133) magnet, thereby securing in place the gathering or the taking up slack in the article of clothing.

8. The apparel cinch clip (100) of claim 7, wherein a faux handle is disposed at the top end (114) of the magnet housing (110).

9. The apparel cinch clip (100) of claim 7, wherein the first segment (152) of the link strap (150) is decorative.

10. The apparel cinch clip (100) of claim 9, wherein the first segment (152) of the link strap (150) comprises beads, chains, a strap of leather, fabric, wire, or string.

11. The apparel cinch clip (100) of claim 7, wherein the second segment (156) of the link strap (150) is plain.

12. The apparel cinch clip (100) of claim 11, wherein the second segment (156) of the link strap (150) is a ribbon, a string, fabric, or a strap of leather.

13. The apparel cinch clip (100) of claim 7, wherein the first hole (166) of the connecting piece is a pinhole, and the second hole (168) of the connecting piece is elongated.

14. An apparel cinch clip (100) for securely gathering or taking up slack in an article of clothing, the cinch clip (100) comprising:
   a. a first member (105) comprising:
      i. a magnet housing (110) having a front surface (113), a top end (114) and a bottom end (116), wherein a first magnet (115) is disposed within the magnet housing (110), wherein a first groove (117) is disposed along a boundary of the magnet housing (110), and wherein a second groove (119) is disposed inside of the magnet housing (110), wherein a first hole (118) is disposed at a top end of the second groove (119), wherein the top end of the second groove is aligned with the top end (114) of the magnet housing (110); and
      ii. a closing component (120) having a top end (124), a bottom end (126), a first ridge (127) complementary to the first groove (117) disposed along a boundary of the closing component such that the first groove (117) and the first ridge (127) snap into place and hold the first magnet inside the first member (105), wherein at least one cut out (121) is disposed on the boundary of the closing component (120), wherein a second hole (128) is disposed at the top end (124) of the closing component, and wherein a third groove (129) is disposed inside of the closing component;

b. a second member (106) comprising:
  i. a decorative component (130), wherein the decorative component comprises a decorative component front surface (131) having a. decorative component top end (135) and a decorative component bottom end (137) and a decorative component back surface (132), wherein a cavity (136) is disposed within the decorative component back surface (132), wherein a second magnet (133) is disposed in the cavity (136), wherein the cavity (136) is the same shape as a decorative component closing cap (134), wherein at least one groove (147) is disposed at a bottom of a side of the cavity (136), wherein a hole (146) is disposed inside and at the top end (135) of the decorative component (130); and
  ii. the decorative component closing cap (134), wherein the decorative component closing cap (134) comprises a tab (138) wherein a third hole (139) is disposed through the tab (138), wherein a pole (145) is disposed on the tab (138) under the third hole (139) wherein the pole (145) fits into the hole (146) of the decorative component, wherein at least one tongue (144) is disposed along a boundary of the decorative component closing cap such that the at least one tongue (144) fits into the at least one groove (147) to snap into place and hold the second magnet (133) inside the second member (106), wherein the tab (138) is aligned with the decorative component top end (135); and
c. a link strap (150) comprising:
  i. a connector piece (160) comprising a first end (162) and a second end (164), wherein a first hole (166) is disposed at the first end of the connector piece, and a second hole (168) is disposed at the second end of the connector piece, wherein the connector piece is u-shaped from the first end (162) to the second end (164);
  ii. a first segment (152) comprising a first strap end (153) and a second strap end (154), wherein the first strap end (153) of the first segment is threaded through the third hole (139) of the decorative component closing cap and wrapped around the pole (145) to secure the first segment in the decorative component, wherein the second strap end (154) of the first segment (152) is coupled to the first hole (166) of the connector piece (160); and
  iii. a second segment (156) comprising a first strap end (157) and a second strap end (158), wherein the second segment (156) is threaded through the second hole (168) of the connector piece (160), wherein the first strap end (157) of the second segment is threaded through the first hole (118) of the magnet housing (110) and is fixedly disposed in the second groove (119) of the magnet housing (110), wherein the second strap end (158) of the second segment (156) is threaded through the second hole (128) of the closing component and is fixedly disposed in the third groove (129) of the closing component (120), wherein the first strap end (157) and the second strap end (158) are secured in place with an adhesive; and wherein to use the apparel cinch clip (100), a user loops the link strap (150) around the clothing such that the clothing is disposed between the magnets and the first (115) magnet is magnetically connected to the second (133) magnet, thereby securing in place the gathering or the taking up slack in the article of clothing.

15. The apparel cinch clip (100) of claim 14, wherein a faux handle is disposed at the top end (114) of the magnet housing (110).

16. The apparel cinch clip (100) of claim 14, wherein the first segment (152) of the link strap (150) is decorative.

17. The apparel cinch clip (100) of claim 16, wherein the first segment (152) of the link strap (150) comprises beads, chains, a strap of leather, fabric, wire, or string.

18. The apparel cinch clip (100) of claim 14, wherein the second segment (156) of the link strap (150) is plain.

19. The apparel cinch clip (100) of claim 18, wherein the second segment (156) of the link strap (150) is a ribbon, a string, fabric, or a strap of leather.

20. The apparel cinch clip (100) of claim 14, wherein the first hole (166) of the connecting piece is a pinhole, and the second hole (168) of the connecting piece is elongated.

\* \* \* \* \*